United States Patent
Tokunaga

(10) Patent No.: US 9,513,867 B1
(45) Date of Patent: Dec. 6, 2016

(54) SYSTEM AND METHOD FOR MANAGING COMMUNICATIONS ON A MOBILE COMMUNICATION DEVICE BASED UPON A USER'S BEHAVIOR

(71) Applicant: Honda Motor Co., Ltd., Minato-ku, Tokyo (JP)

(72) Inventor: Kazunori Tokunaga, Redondo Beach, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 14/745,143

(22) Filed: Jun. 19, 2015

(51) Int. Cl.
  *G06F 17/00* (2006.01)
  *G06F 3/16* (2006.01)
  *G11B 20/10* (2006.01)

(52) U.S. Cl.
  CPC ......... *G06F 3/165* (2013.01); *G11B 20/10527* (2013.01); *G11B 2020/10546* (2013.01)

(58) Field of Classification Search
  CPC ............... G11B 20/10527; G11B 2020/10546; G06F 3/165
  USPC ....... 379/37–52, 67.1–93.37, 201.01; 700/94
  See application file for complete search history.

(56) References Cited

U.S. PATENT DOCUMENTS

| | | | |
|---|---|---|---|
| 7,084,758 B1 | 8/2006 | Cole | |
| 7,543,032 B2 | 6/2009 | Mitchell et al. | |
| 7,873,646 B2* | 1/2011 | Yach | G06F 9/542 |
| | | | 455/412.2 |
| 8,289,158 B2 | 10/2012 | Bocking et al. | |
| 8,527,263 B2* | 9/2013 | Bradley | G06F 17/2785 |
| | | | 379/142.17 |
| 8,610,564 B2 | 12/2013 | Bocking et al. | |
| 8,779,947 B2 | 7/2014 | Tengler et al. | |
| 8,929,871 B2 | 1/2015 | Bradburn | |
| 8,965,987 B2 | 2/2015 | Lehmann et al. | |
| 2005/0148890 A1 | 7/2005 | Hastings | |
| 2005/0273493 A1 | 12/2005 | Buford et al. | |
| 2006/0135139 A1* | 6/2006 | Cheng | H04M 1/72569 |
| | | | 455/418 |
| 2009/0199192 A1 | 8/2009 | Laithwaite et al. | |
| 2010/0022279 A1* | 1/2010 | Hoberg | H04M 3/02 |
| | | | 455/567 |
| 2010/0042912 A1 | 2/2010 | Whitaker | |
| 2010/0049074 A1* | 2/2010 | Cortenraad | G06Q 30/00 |
| | | | 600/544 |
| 2010/0312547 A1 | 12/2010 | Van Os et al. | |

(Continued)

*Primary Examiner* — Hemant Patel
(74) *Attorney, Agent, or Firm* — Arent Fox LLP

(57) ABSTRACT

A device for managing communications on a mobile communication device based upon behavior of a user has a controller, The controller reviews data stored within applications of the mobile communication device, identifies one or more key terms within applications stored on the mobile communication device, determines if the one or more key terms belongs to at least one of the plurality of pre-defined mood categories, generates one or more reminder task items associated with the data and the one or more key terms identified, identifies a genre of music being played on an audio source, and determines whether the genre of music belongs to at least one of a plurality of pre-defined mood categories. The controller generates a notification message associated with one of the reminder task items when the genre of music being played and the associated one or more reminder task items belong to the same pre-defined mood category.

18 Claims, 4 Drawing Sheets

(56) References Cited

U.S. PATENT DOCUMENTS

| | | | |
|---|---|---|---|
| 2012/0007740 A1* | 1/2012 | Kangas | H04M 1/72569 340/573.1 |
| 2012/0016678 A1 | 1/2012 | Gruber et al. | |
| 2012/0219133 A1 | 8/2012 | Hawkins | |
| 2012/0309363 A1 | 12/2012 | Gruber et al. | |
| 2013/0246449 A1 | 9/2013 | Balannik et al. | |
| 2014/0033071 A1 | 1/2014 | Gruber et al. | |
| 2014/0094156 A1* | 4/2014 | Uusitalo | H04W 4/12 455/418 |
| 2014/0108307 A1 | 4/2014 | Raghunathan et al. | |
| 2014/0189016 A1 | 7/2014 | Goldsmith et al. | |
| 2014/0204718 A1 | 7/2014 | Heinberg et al. | |
| 2014/0232534 A1* | 8/2014 | Birnbaum | G06F 3/016 340/407.1 |
| 2014/0247158 A1 | 9/2014 | Tengler et al. | |
| 2015/0358415 A1* | 12/2015 | Cronin | H04L 67/22 709/217 |

\* cited by examiner

SYSTEM AND METHOD FOR MANAGING COMMUNICATIONS ON A MOBILE COMMUNICATION DEVICE BASED UPON A USER'S BEHAVIOR

TECHNICAL FIELD

The present application in general relates to mobile communication devices, and more specifically, to a system and method for managing communications on a mobile communication device based upon a user's behavior.

BACKGROUND

Personal Information Management (PIM) applications and Personal Data Management (PDM) applications may be used on mobile communication devices such as smartphones, tablet computers, and other portable electronic devices. PIM and PDM applications may include calendar applications to store calendar entries or other task items that may be used to remind the user of upcoming events or items that may need to be performed and/or accomplished.

PIM and PDM applications may include contact management applications. Contact management applications may be used to store personal and/or business contacts. Contact management applications may allow a user to set certain profiles for the different contacts entered to manage incoming communications based upon the identity of the contact. For example, some contact management applications may allow a user to set a user's preference to block certain contacts and/or send the call from a designated contact directly to voicemail. Contact management applications may allow a user to set certain profiles to manage incoming communications depending upon the location of the user. For example, if a user is in a library, the user may select a profile so that all incoming phone calls are sent directly to voicemail. Contact management applications may allow a user to set certain profiles to block all incoming calls except for emergency calls during a certain time, such as when a user is sleeping.

PIM and PDM applications may use call history applications to store the date and time information of phone calls received and made from the mobile communication device. PIM and PDM applications may include messaging applications and e-mail applications to draft, store, and send text messages, chat messages, and e-mails. Some PIM and PDM applications may include applications that may generate reminder task items depending upon certain calendar events saved within the mobile electronic device. For example, a reminder notification and/or text message may be sent of upcoming calendar events.

While it may be beneficial to provide the user with the ability to set certain profiles depending upon his location or depending upon the identity of the contact, each of these profiles generally needs to be set by the user manually. There may be other situations which may affect the way that the user may wish to receive communications. For example, the user may be in an angry mood and does not wish to be disturbed by incoming calls. And while it may be beneficial to provide the user with a system that sends notifications to the user depending upon relationships between calendar items and personal contacts, it may be beneficial to provide a system that creates and sends notifications to the user depending upon the user's mood.

It would thus be desirable to provide a system and method for managing communications on a mobile communication device based upon a user's behavior.

SUMMARY

In accordance with one embodiment, a device for managing communications on a mobile communication device based upon behavior of a user is disclosed. The device has a controller reviewing date stored within applications of the mobile communication device, identifying one or more key terms within applications stored on the mobile communication device, determining if the one or more key terms belongs to at least one of the plurality of pre-defined mood categories, generating one or more reminder task items associated with the data and the one or more key terms identified, identifying a genre of music being played on an audio source, and determining whether the genre of music belongs to at least one of a plurality of pre-defined mood categories. The controller generating a notification message associated with one of the reminder task items when the genre of music being played and the associated one or more reminder task items belong to the same pre-defined mood category.

In accordance with one embodiment, a device for managing communications on a mobile communication device based upon behavior of a user is disclosed. The device has a music genre recognition module identifying the genre of music being played on an audio source and determining whether the genre of music belongs to at least one of a plurality of pre-defined mood categories. A term recognition module identifying one or more key terms within applications stored on the mobile communication device and identifying whether the one or more key terms belongs to at least one of the plurality of pre-defined mood categories. A reminder task item generator module generating one or more reminder task items associated with the data and the one or more key terms identified. A notification generator module generating a notification message associated with one of the reminder task items when the genre of music being played and the associated one or more reminder task items belong to the same pre-defined mood category.

In accordance with one embodiment, a method for managing communications on a mobile communication device based upon behavior of a user is disclosed. The method comprising: reviewing date stored within applications of the mobile communication device; identifying one or more key terms within applications stored on the mobile communication device; determining if the one or more key terms belongs to at least one of the plurality of pre-defined mood categories; generating one or more reminder task items associated with the data and the one or more key terms identified; identifying a genre of music being played on an audio source; determining whether the genre of music belongs to at least one of a plurality of pre-defined mood categories; and generating a notification message associated with one of the reminder task items when the genre of music being played and the associated one or more reminder task items belong to the same pre-defined mood category.

BRIEF DESCRIPTION OF THE DRAWINGS

The present application is further detailed with respect to the following drawings. These figures are not intended to limit the scope of the present application but rather illustrate certain attributes thereof.

DESCRIPTION OF THE INVENTION

The description set forth below in connection with the appended drawings is intended as a description of presently preferred embodiments of the disclosure and is not intended to represent the only forms in which the present disclosure may be constructed and/or utilized. The description sets forth the functions and the sequence of steps for constructing and operating the disclosure in connection with the illustrated embodiments. It is to be understood, however, that the same or equivalent functions and sequences may be accomplished by different embodiments that are also intended to be encompassed within the spirit and scope of this disclosure.

Embodiments of the exemplary system and method may allow for certain behaviors of a user to be used to manage communications on a mobile communication device of the user. For example, if a behavior of the user is determined to indicate that the user is in a negative mood, then the contact management application of the mobile communication device may receive instructions to send all incoming phone calls directly to voicemail, with possible exceptions of phone calls from family members or emergency numbers. As another example, if the user's behavior is determined to indicate that the user is in a positive mood, then a notification message may be generated and sent to the user to perform a specific action, like buying flowers for a spouse for their anniversary.

Figure 1:
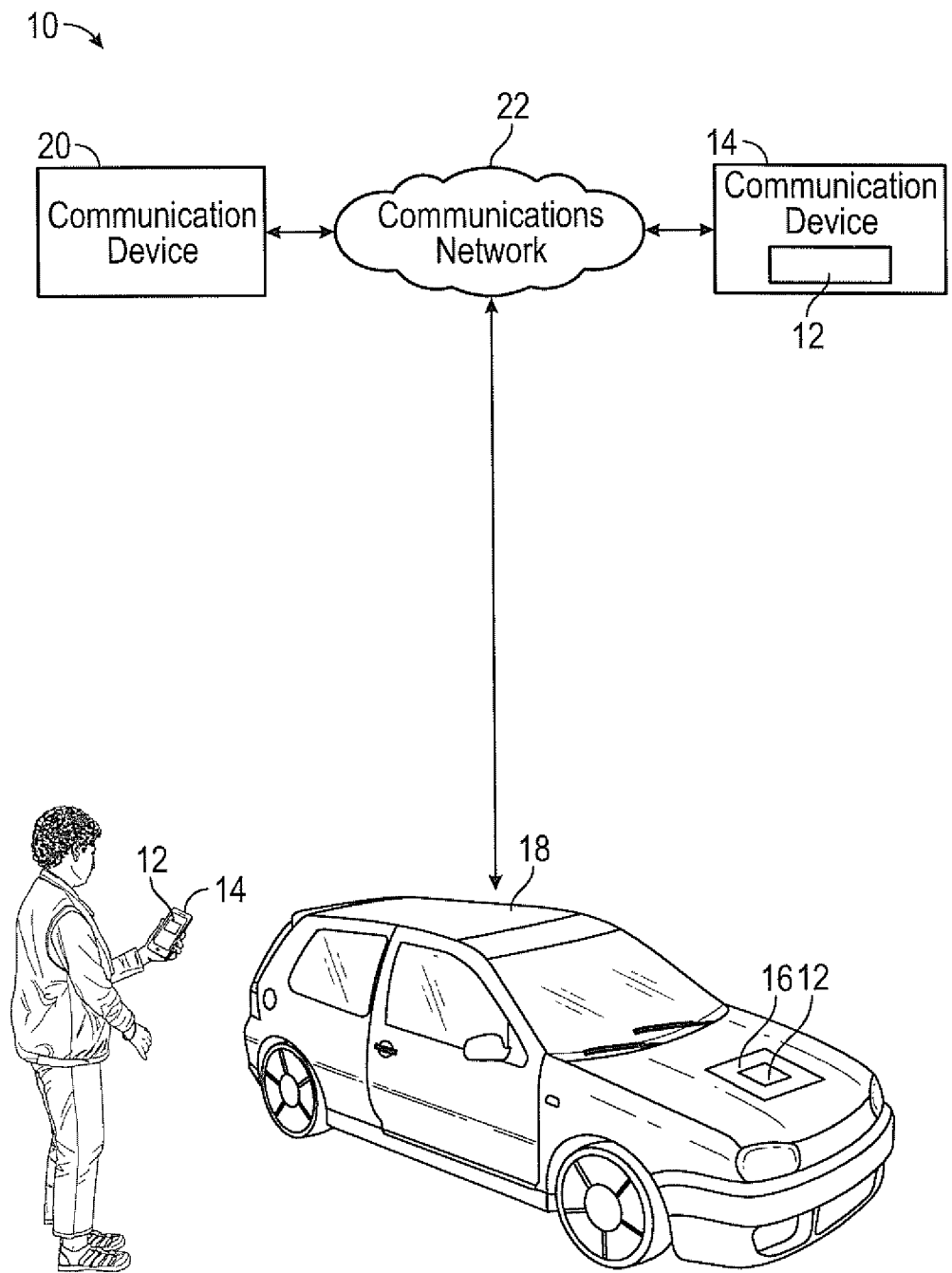
FIG. 1 is a function block diagram of an exemplary communications network having a system for managing communications on a mobile communication device based upon a user's behavior according to one aspect of the present application.

FIG. 1 is a block diagram of an exemplary communication system 10 in which a communication management module 12 (hereinafter module 12) for managing communications on a mobile communication device 14 based upon a user's behavior may be implemented. The module 12 may be part of the mobile communication device 14. Alternatively, the module 12 may be part of a telematic system 16 of a vehicle 18. When a user enters the vehicle 18, the mobile communication device 14 may sync with the telematic system 16 which may allow the module 12 forming part of the telematic system 16 to manage communications on the mobile communication device 14.

The mobile communication device 14 may communicate with one or more other communication devices 20. The other communication devices 20 may be a landline telephone, cellular phone, desktop computer, laptop, tablet computer, another smartphone or other types of communication devices. The mobile communication device 14 may communicate with one or more other communication devices 20 via a communication network 22. The communication network 22 may include a fixed wire line network, cable, and fiber optics, over the air broadcasts, cellular, satellite, local area network (LAN), wide area network (WAN), or global network (e.g. Internet). The mobile communication device 14 and the other communication device 20 may communicate with each other by sending and/or receiving voice, text, or other date based communications.

Figure 2:
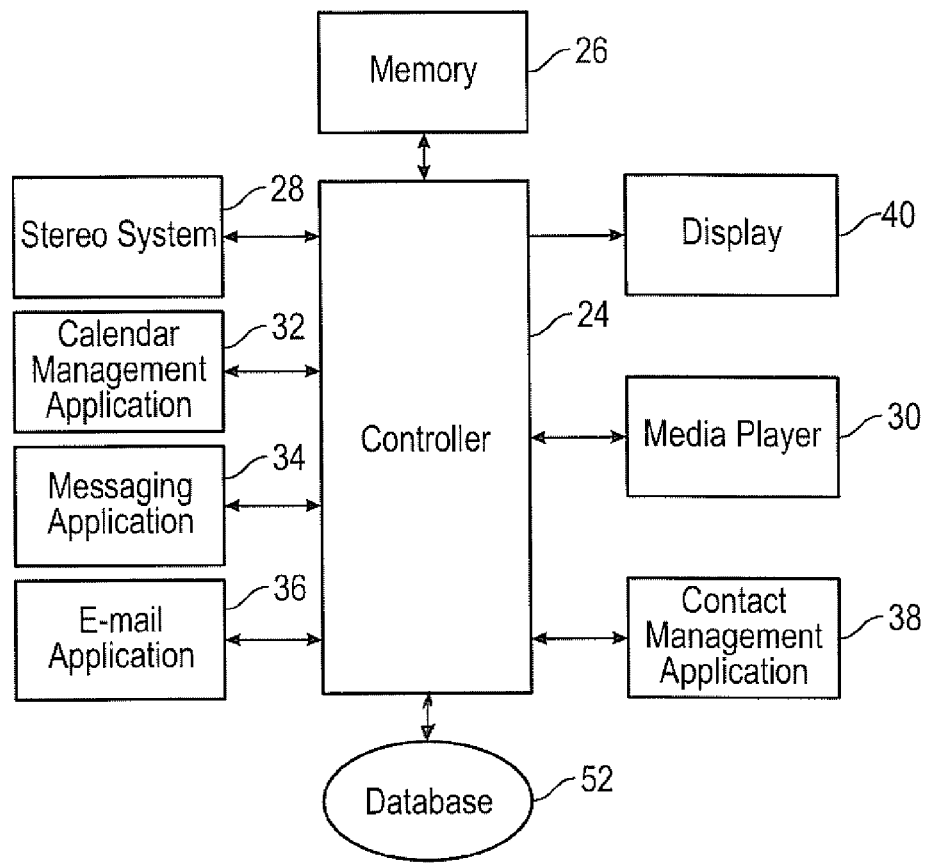
FIG. 2 is a block diagram showing data sources of a controller used in the system depicted in FIG. 1 according to one aspects of the present application.

Referring to FIGS. 1-2, a controller 24 may be part of the mobile communication device 14 and/or alternatively, the controller 24 may be part of the telematic system 16 of the vehicle 18. A "controller," as used herein, processes signals and performs general computing and arithmetic functions. Signals processed by the controller 24 may include digital signals, data signals, computer instructions, processor instructions, messages, a bit, a bit stream, or other means that can be received, transmitted and/or detected. Generally, the controller 24 may be a variety of various microcontroller and/or processors including multiple single and multicore processors and co-processors and other multiple single and multicore processor and co-processor architectures. The processor can include various modules to execute various functions.

The controller 24 may store a computer program or other programming instructions associated with a memory 26 to execute operation of the module 12 and to analyze data received. The data structures and code within the software in which the present application may be implemented, may typically be stored on a non-transitory computer-readable storage. The storage may be any device or medium that may store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. The controller 24 may comprise various computing elements, such as integrated circuits, microcontrollers, microprocessors, programmable logic devices, etc., alone or in combination to perform the operations described herein.

The module 12 may be a computer program which may be stored within the controller 24 and/or memory 26. The module 12 may allow for certain behaviors of the user to be used to manage communications on the mobile communication device 14 of the user. The controller 24 may receive data from an audio source such as a stereo system 28 of the vehicle 14 or a media player 30 of the mobile communication device 14. For example, the data from the audio source may contain data related to a title of a current song being played, genre of the current song being played, name of the radio station or compact disc playing the current song, as well as other data relating to the song.

The controller 24 may receive data from one or more applications that may be loaded into the mobile communication device 14. For example, the controller 24 may receive data from or may search data in one or more calendar management application(s) 32 (e.g. calendar entries or task items); one or more messaging application(s) 34 (e.g. text messages or chat messages); one or more e-mail application(s) 36 (e.g. e-mails); one or more contact management application(s) (e.g. names, phone numbers, addresses) 38 as well as other applications that may be stored on the mobile communication device 14.

The controller 24 may take and process data captured from the calendar management application(s) 32, the messaging application(s) 34, the email application(s) 34, the contact management application(s) and other applications and generate one or more reminder task items. Each reminder task item may be relevant to the data captured from the calendar management application(s) 32, the messaging application(s) 34, the email application(s) 36 the contact management application(s) and other applications. The controller 24 may form correlating relationship information between the user and the data captured from the calendar management application(s) 32, the messaging application(s) 34, the email application(s) 34, the contact management application(s) 38 and other applications. Thus, if a user receives a phone call, email and/or text message form a party, the controller 24 may process the name of the party calling or sending the email and/or text and generate reminder task items of upcoming events found on the calendar management application(s) 32. For example, if the calling party is the spouse of the user, the controller 24 may generate a reminder of upcoming event such as the spouse's birthday, anniversary, or similar important dates. The reminder generated may be a simple reminder of the upcoming data or may include a message such as "Buy flowers for wife's birthday" or "Make reservations at XYZ restaurant" where XYZ may be the spouse's favorite eating establishment. The controller 24 may determine the spouse's favorite eating establishment by processing the data from the calendar management application(s) 24, the messaging application(s) 26, the email application(s) 28 and/or other applications on the user's mobile communication device 14. The reminder generated may be shown on a display 40. The display 40 may be a display on the mobile communication device 14 and/or a display on the telematic system 16 of the vehicle 18.

The controller 24 may determine whether there is a relationship between a genre of music that the user is listening to and the one or more reminder task items. If the controller 24 determines that a relationship exists between the genre of music and one or more reminder task items, then the controller 24 may generate and send a notification message to be shown on the display 40. The notification message may be relevant to the particular reminder task item(s) that the controller 24 determined to have a relationship to the genre of music. For example, if the controller 24 determines that the genre of music the user is listening to is a "romantic" genre, the controller 24 may generate a message shown on the display 40 to call the spouse. The controller 24 may review the calendar management application(s) 32 and may generate a reminder message shown on the display 40 of upcoming events such as the spouse's birthday, anniversary, or similar important dates. The reminder generated may be a simple reminder of the upcoming data or may include a message such as "Buy flowers for wife's birthday" or "Make reservations at XYZ restaurant" where XYZ may be the spouse's favorite eating establishment.

Instead of generating and sending a notification message, the controller 24 may generate and send instructions to the contact management application 38 loaded on the mobile communication device 14 to implement a user profile that may modify the managing/processing of incoming communications (e.g. sending all incoming phone calls directly to voicemail, placing the ringtone volume to silent and/or vibrate). For example, the controller 24 may determine after reviewing data captured from the calendar management application(s) 32, the messaging application(s) 34, the email application(s) 34, the contact management application(s) 38 and other applications that the user may not want to be disturbed and may send all incoming phone calls directly to voicemail, may send all incoming phone calls directly to voicemail except for emergency calls from family members, may place the ringtone volume to silent and/or vibrate, or similar functions that may limit the disturbances to the user.

The controller 24 may determine that the user may not want to be disturbed by the gene of music the user is listening to and/or the decibel level of the music being heard. For example, if the genre of music the user is listening to is a "hard rock" genre, the controller 24 may determine that the user does wish to be disturbed and may send all incoming phone calls directly to voicemail, may send all incoming phone calls directly to voicemail except for emergency calls from family members, may place the ringtone volume to silent and/or vibrate, or similar functions that may limit the disturbances to the user. If the user is listening to music at a decibel level above a predetermined limit, the controller 24 may determine that the user does wish to be disturbed and may send all incoming phone calls directly to voicemail, may send all incoming phone calls directly to voicemail except for emergency calls from family members, may place the ringtone volume to silent and/or vibrate, or similar functions that may limit the disturbances to the user.

Figure 3:
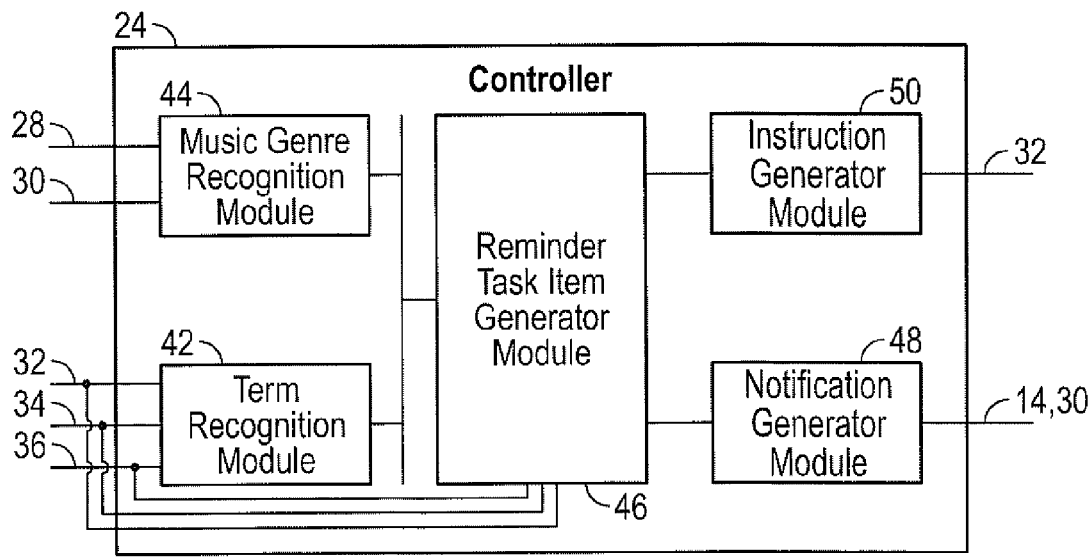
FIG. 3 is a simplified functional block diagram of the controller of FIG. 2 according to one or more aspects of the present invention.
Figure 4:
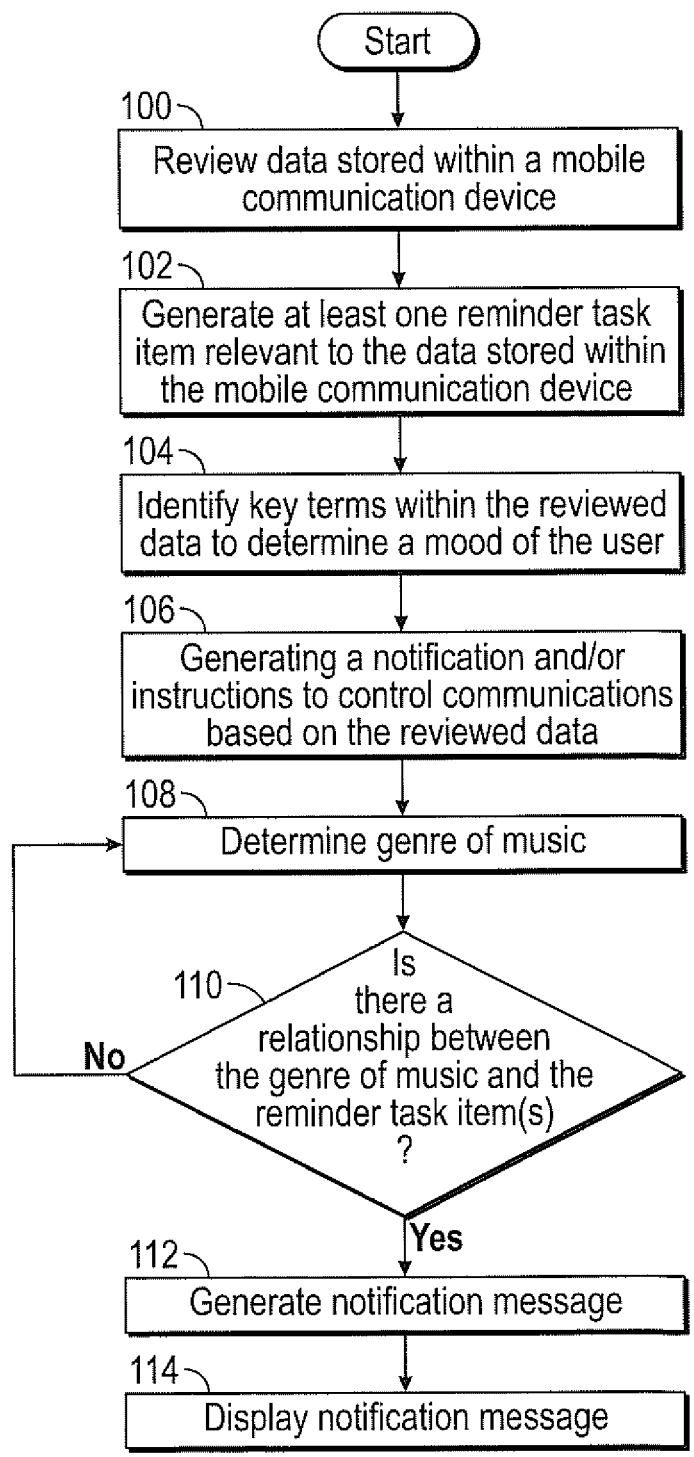
FIG. 4 is an exemplary flowchart depicting a system for managing communications on a mobile communication device based upon a user's behavior according to one or more aspects of the present invention.
Figure 5:
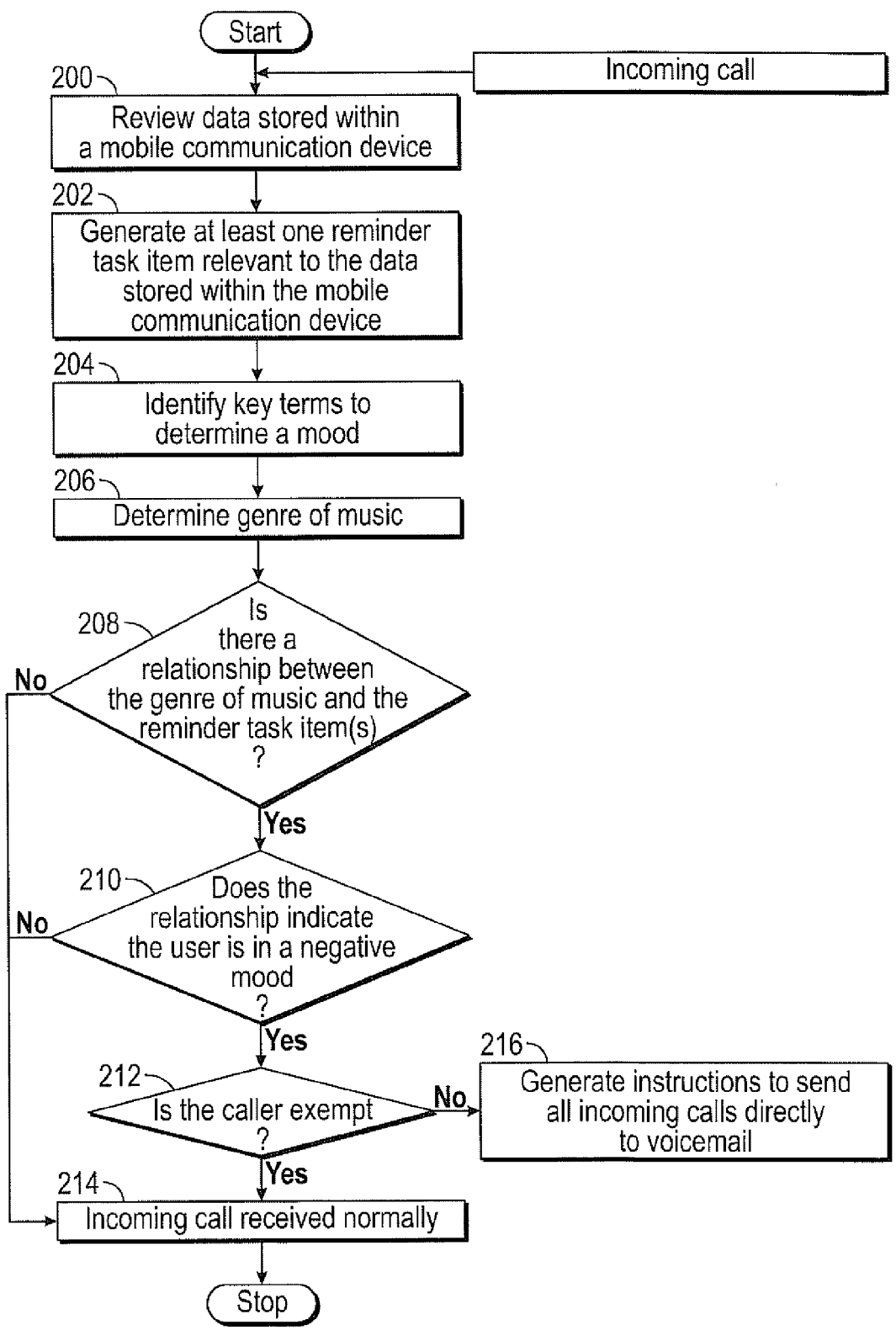
FIG. 5 is an exemplary flowchart depicting one embodiment of the system for managing communications on a mobile communication device based upon a user's behavior according to one or more aspects of the present invention.

Referring to FIG. 3, a block diagram of an exemplary embodiment of the controller 24 may be seen. Data from the calendar management application(s) 32, the messaging application(s) 34, the email application(s) 34, the contact management application(s) 38 and other applications on the mobile communication device 14 may be sent to the controller 24. Data from the calendar management application(s) 32, the messaging application(s) 34, the email application(s) 34, the contact management application(s) 38 and/or other applications on the mobile communication device 14 may be sent to a reminder task item generator module 46. The reminder task item generator module 46 may review the data and send signals to the notification generator module 48 to generate notifications of upcoming events. For example, data from the calendar management application(s) 32 may be reviewed by the reminder task item generator module 46 which may send signals to the notification generator module 48 to generate notifications of upcoming events. Data from the messaging application(s) 34 and/or the email application(s) 34 may be reviewed by the reminder task item generator module 46 which may send signals to the notification generator module 48 to generate notifications of upcoming events. The reminder task item generator module 46 may review the data for dated hyperlinks of upcoming events located in the messaging application(s) 34 and/or the email application(s) 34 and send signals to the notification generator module 48 to generate notifications of upcoming events based on the reviewed data.

The controller 24 may have a term recognition module 42. The term recognition module 42 may process the data from the calendar management application(s) 32, the messaging application(s) 34, and/or the email application(s) 36. The term recognition module 36 may be configured to identify one or more key terms within the data from the calendar management application(s) 32, the messaging application(s) 34, and/or the email application(s) 36. The term recognition module 36 may compare the key terms of the data from the calendar management application(s) 32, the messaging application(s) 34, and/or the email application(s) 36 with pre-determined terms and/or phrases stored in a database 52. The pre-deter mined terms stored in the database 52 may be grouped into categories of words or phrases that may typically indicate a certain mood. For example, phrases like "Wedding Anniversary", "Raise", "Promotion" or other positive terms may be grouped into a pre-defined positive mood category, whereas words like "fired" or phrases like "laid off", "reduction in force" and similar negative phrases and/or words may be grouped into a pre-defined negative mood category. Thus, when the term recognition module 42 identifies key terms in the data that are found to correspond to one or more-predetermined terms in the database 52, the term recognition module 42 may identify those key terms as belonging to a positive mood category (e.g. happy, excited, grateful etc.) or a negative mood category (e.g. angry, sad, anxious, etc.).

The reminder task item generator module 46 may be configured to generate a list of one or more reminder task items by relying on the key terms from the data that have been identified within the data captured from the calendar management application(s) 24, the messaging application(s) 26, and/or the email application(s) 28. For example, if the phrase "Wedding Anniversary" was identified in a calendar event in the user's mobile communication device 14, and the words "Wedding Anniversary" have been identified as belonging to a positive mood category, then the reminder task item generator module 46 may send a signal to a notification generator module 48. The notification generator module 48 may generate a reminder task item such as "Buy Wife Flowers for Wedding Anniversary." However, if the As another example, if the word "fired" and/or the phrase "laid off" have been identified as belonging to a negative mood category, then the reminder task item generator module 40 may send a signal to the notification generator module 48 to generate a reminder task item such as "Update Resume and Apply for New Job."

If words have been identified as belonging to a negative mood category, the reminder task item generator module 40 may send a signal to an instruction generator module 59. The reminder task item generator module 40 may determine that the user does wish to be disturbed since the user may be in a "negative mood" and may send a signal to the instruction generator module 50 to send all incoming phone calls directly to voicemail, send all incoming phone calls directly to voicemail except for emergency calls from family members, place the ringtone volume to silent and/or vibrate, or similar functions that may limit the disturbances to the user.

The controller 24 may process conflicting data. For example, the controller 24 may process data from the calendar management application(s) 32 indicating a "Wedding Anniversary". However, the term recognition module 42 may identify a plurality of key terms as belonging to a negative mood category. For example, the term recognition module 36 may review the data from the calendar management application(s) 32, the messaging application(s) 34, and/or the email application(s) 36 with pre-determined terms and/or phrases stored in a database 52 and find words like "divorce", "divorce attorney" as well as calls from a "divorce attorney". In this situation, since the term recognition module 42 identified a plurality of words/terms that may conflict with "wedding anniversary", the reminder task item generator module 46 may send a signal to prevent the notification generator module 48 from displaying a reminder from the calendar management application(s) 32 indicating a "Wedding Anniversary".

The controller 24 may also have a music genre recognition module 44. The music genre recognition module 44 may process the data received from the stereo system 28 of the vehicle 18 or the media player 30 of the mobile communication device 14. The music genre recognition module 44 may be configured to receive music genre data that may be provided by the traditional AM or FM radio broadcast station, satellite radio station, or internet radio station to which the stereo system 28 is set as well as music genre data that may be provided by the media player 30 of the mobile communication device 14. The music genre recognition module 44 may monitor the number of times a particular music genre is played during a certain time frame. If a particular genre is played a predetermined number of times during a certain time frame, the reminder task item generator module 46 may generate a signal for a predetermined notification to be generated. For example, if the user is listens to a "romantic" genre for a predetermined amount of time, the notification generator module 48 may send a signal to the notification generator module 48 to generate a message shown on the display 40 to call the spouse. If the user is listening to a "romantic" genre for a predetermined amount of time, the reminder task item generator 46 may review the calendar management application(s) 32 and may signal the notification generator 48 to generate a reminder message shown on the display 40 of upcoming event such as the spouse's birthday, anniversary, or similar important dates. The reminder generated may be a simple reminder of the upcoming data or may include a message such as "Buy flowers for wife's birthday" or "Make reservations at XYZ restaurant" where XYZ may be the spouse's favorite eating establishment.

If the genre of music that the user may be listening to is a "hard rock" genre, the reminder task item generator module 46 may determine that the user does wish to be disturbed and may send a signal to the instruction generator module 50 to send all incoming phone calls directly to voicemail, send all incoming phone calls directly to voicemail except for emergency calls from family members, place the ringtone volume to silent and/or vibrate, or similar functions that may limit the disturbances to the user.

Referring to FIGS. 1-5, operation if the controller 24 for managing communications on a mobile communication device 14 based upon a user's behavior according to one aspect of the present invention may be described. As described above, the controller 24 may review data within different applications of the mobile communication device 14 in block 100 The controller 24 may review data within the calendar management application(s) 24 (e.g. calendar entries or task items); one or more messaging application(s) 26 (e.g. text messages or chat messages); and/or one or more e-mail application(s) 28 (e.g. e-mails) stored on or conveyed through the user's mobile communication device 14 and may generate at block 102 at least one reminder task item relevant to the data stored on or conveyed through the mobile communication device 14. At block 104, the controller 24 may identify one or more key terms within the data from the calendar management application(s) 32, the messaging application(s) 34, the email application(s) 36 and/or other applications on the mobile communication device 14. The term recognition module 36 may compare the key terms of the data from the calendar management application(s) 32, the messaging application(s) 34, the email application(s) 36 and/or other applications with pre-determined terms and/or phrases stored in a database 52 to determine whether the key terms from the data correspond to one or more pre-determined terms and/or phrases. The pre-determined terms stored in the database 52 may be grouped into categories of words or phrases that may typically indicate a certain mood. For example, the term recognition module 42 may identify key terms as belonging to a positive mood category (e.g. happy, excited, grateful etc.) or a negative mood category (e.g. angry, sad, anxious, etc.). Based on the mood of the user, the term recognition module 42 may send signals to the notification generator module 48 and/or the instruction generator module 50 and may generate at least one notification relevant to the data stored and/or instructions to manage communications on a mobile communication device 14 as shown in block 106.

The system 10 may determine the genre of music that the user is listening to on his vehicle 12 stereo system 20 as shown at block 108. As mentioned above, the stereo system 20 may play music from various sources such as, but not limited to, traditional AM or FM radio broadcast stations, satellite radio stations, internet radio stations, CDs, portable media players, and media player applications loaded onto a user's mobile communication device 14. The stereo system 20 may also receive information from the various music sources regarding the genre of all of the music being played on a particular radio station, the genre of the specific song currently being played, as well as the name of the music artist and the title of the song currently being played. This information may also be displayed to the user through the user interface of the stereo system 20 or the display 30 of the vehicle telematics system. This information may be received by the controller 26.

At block 110, the controller 24 may determine whether there is a relationship between the genre of music that the user is listening to on the stereo system 20 and the one or more reminder task items. For example, a user may select the radio station that exclusively plays love songs because the user is in a positive mood (e.g. happy, in love, etc.). As another example, a user may select a hard rock radio station or specific hard rock song because the user is in a negative mood (e.g. sad, angry, etc.). The controller 24 may review the reminder task item list for any reminder task items that may be relevant to a particular pre-defined mood category. For example, the controller 24 may search the reminder task items for certain key words that belong to the positive mood category and may locate the reminder task item for "Wedding Anniversary" or "Make Reservations For Wedding Anniversary". As a further example, the controller 24 may search the reminder task items for certain key words that belong to the negative mood category and may locate the reminder task item for "Update Resume and Apply for New Job" or "Layoffs".

If the controller 24 determines that there is a relationship between the genre of music and one or more reminder task items in block 110, the controller 24 at block 112 may generate one or more notification messages for the user that is relevant to the reminder task item. For example, if the user is listening to a "romantic" genre of songs and controller identifies "Wedding Anniversary" in the reminder task item, the controller 24 may generate a notification message for the user such as "Buy Wife Flowers for Wedding Anniversary" or "Make Reservations For XYZ Restaurant for Wedding Anniversary". The notification message at generated at box 112 may be sent to and displayed as shown in box 114. The notification message may be sent to and shown on the display 40 of the telematics system of the vehicle 12 or it may be displayed on the user's mobile communication device 14 as a text message or calendar notification.

On the other hand, where the controller 24 may determine that there is no relationship between the genre of music and the reminder task item(s) at block 110. For example, while the user may be listening to a "hard rock" genre of songs at a loud decibel, upon reviewing the data from the different applications on the user's mobile communication device 14, the controller 24 may not identify any data that matches with pre-determined terms and/or phrases stored in a database 52 to identify why the user may be in a particular mood to listen to a "hard rock" genre of songs at a loud decibel. Where the controller 24 may determine that there is no relationship between the genre of music and the reminder task item(s) at block 110, the controller 24 may not generate or display any such notification message and may continue to review whether there is a relationship between the genre of music that the user is currently listening to and the one or more reminder task items at block 110.

Referring to FIGS. 1-4 and 6, operation of the controller 24 for managing communications on a mobile communication device 14 based upon a user's behavior according to another aspect of the present invention may be described. When the mobile communication device 14 receives an incoming call, the controller 24 may review data within different applications of the mobile communication device 14 in block 200 and may generate at least one reminder task item relevant to the data stored on or conveyed through the mobile communication device 14 in block 202. At block 204, the controller 24 may identify one or more key terms within the data from the calendar management application(s) 32, the messaging application(s) 34, the email application(s) 36 and/or other applications on the mobile communication device 14. The term recognition module 36 may compare the key terms of the data from the calendar management application(s) 32, the messaging application(s) 34, the email application(s) 36 and/or other applications with pre-determined terms and/or phrases stored in a database 52 to determine whether the key terms from the data correspond to one or more pre-determined terms and/or phrases. The pre-determined terms stored in the database 52 may be grouped into categories of words or phrases that may typically indicate a certain mood. For example, the term recognition module 42 may identify key terms as belonging to a positive mood category (e.g. happy, excited, grateful etc.) or a negative mood category (e.g. angry, sad, anxious, etc.). Based on the mood of the user, the term recognition module 42 may send signals to the notification generator module 48 and/or the instruction generator module 50 and may generate at least one notification relevant to the data stored and/or instructions to manage communications on a mobile communication device 14.

The system 10 may determine the genre of music that the user is listening to on his vehicle 12 stereo system 20 as shown in block 206. When the controller 24 determines that there is a relationship between the genre of music and one or more reminder task items, the controller 24 at block 210 may determine whether the relationship indicates that the user is in a negative mood (e.g. sad or angry). Where the controller 24 determines that the relationship indicates that the user is in a negative mood at block 210, the controller 24 may review the contact management application(s) 38 to determine whether the calling party is on an exempt list. If the caller is on the exempt list, the incoming call is placed through as shown in block 214. However, if the calling party is not on the exempt list, at block 216 the controller 24 may generate and send instructions to direct the incoming phone call directly to voicemail, placing the ringtone volume to silent and/or vibrate, or similar instructions so that the user is not disturbed.

The foregoing description is illustrative of particular embodiments of the application, but is not meant to be a limitation upon the practice thereof. The following claims, including all equivalents thereof, are intended to define the scope of the application.

What is claimed is:

1. A device for managing communications on a mobile communication device based upon behavior of a user comprising:

a controller reviewing data stored within applications of the mobile communication device, identifying one or more key terms within applications stored on the mobile communication device, determining if the one or more key terms belongs to at least one of a plurality of pre-defined mood categories, generating one or more reminder task items associated with the data and the one or more key terms identified, monitoring a decibel level of a song being played on an audio source to identify a genre of music being played on the audio source, and determining whether the genre of music belongs to at least one of the plurality of pre-defined mood categories, wherein the controller generating a notification message associated with one of the reminder task items when the genre of music being played and the associated one or more reminder task items belong to the same pre-defined mood category.

2. The device of claim 1, wherein the controller comprises:
- a music genre recognition module identifying the genre of music being played on the audio source and determining whether the genre of music belongs to at least one of the plurality of pre-defined mood categories;
- a term recognition module identifying the one or more key terms within the applications stored on the mobile communication device and identifying whether the one or more key terms belongs to at least one of the plurality of pre-defined mood categories; and
- a reminder task item generator module generating the one or more reminder task items.

3. The device of claim 2, wherein the controller comprises a notification generator module generating the notification message.

4. The device of claim 2, wherein the controller comprises an instruction generator module modifying incoming communications when the genre of music being played and the associated one or more reminder task items belong to the same pre-defined mood category.

5. The device of claim 4, wherein the instruction generator module sending all incoming phone calls directly to voicemail when the genre of music being played and the associated one or more reminder task items belong to the same pre-defined mood category.

6. The device of claim 4, wherein the instruction generator module setting a ringtone volume of the mobile communication device to at least one of silent and vibrate when the genre of music being played and the associated one or more reminder task items belong to the same pre-defined mood category.

7. The device of claim 1, comprising a database coupled to the controller storing the one or more key terms and grouping the one or more key terms into at least one of the plurality of pre-defined mood categories.

8. The device of claim 2, wherein the term recognition module comparing the one or more key terms from at least one of a calendar event calendar management application, a messaging application, an email application or a contact management application on the mobile communication device of the user.

9. The device of claim 2, wherein the music genre recognition module receiving music genre data from one of a stereo system of a vehicle or a music player on the mobile communication device.

10. A device for managing communications on a mobile communication device based upon behavior of a user comprising:
- a music genre recognition module monitoring a decibel level of a song being played on an audio source to identify the genre of music being played on the audio source and determining whether the genre of music belongs to at least one of a plurality of pre-defined mood categories;
- a term recognition module identifying one or more key terms within applications stored on the mobile communication device and identifying whether the one or more key terms belongs to at least one of the plurality of pre-defined mood categories;
- a reminder task item generator module generating one or more reminder task items associated with the data and the one or more key terms identified; and
- a notification generator module generating a notification message associated with one of the reminder task items when the genre of music being played and the associated one or more reminder task items belong to the same pre-defined mood category.

11. The device of claim 10, comprising an instruction generator module modifying incoming communications when the genre of music being played and the associated one or more reminder task items belong to the same pre-defined mood category.

12. The device of claim 10, comprising a database storing the pre-determined key terms and grouping the pre-determined key terms into at least one of the plurality of pre-defined mood categories.

13. The device of claim 10, wherein the audio source is one of a stereo system coupled to a vehicle of the user or a media player stored on the mobile communication device of the user.

14. The device of claim 10, wherein the term recognition module comparing the one or more key terms from at least one of a calendar event calendar management application, a messaging application, an email application or a contact management application on the mobile communication device.

15. The device of claim 11, wherein the instruction generator module sending all incoming phone calls directly to voicemail when the genre of music being played and the associated one or more reminder task items belong to the same pre-defined mood category.

16. The device of claim 11, wherein the instruction generator module setting a ringtone volume of the mobile communication device to at least one of silent and vibrate when the genre of music being played and the associated one or more reminder task items belong to the same pre-defined mood category.

17. A method for managing communications on a mobile communication device based upon behavior of a user comprising:
- reviewing data stored within applications of the mobile communication device;
- identifying one or more key terms within applications stored on the mobile communication device;
- determining if the one or more key terms belongs to at least one of a plurality of pre-defined mood categories;
- generating one or more reminder task items associated with the data and the one or more key terms identified;
- monitoring a decibel level of a song being played on an audio source to identify a genre of music being played on the audio source;
- determining whether the genre of music belongs to at least one of the plurality of pre-defined mood categories; and
- generating a notification message associated with one of the reminder task items when the genre of music being played and the associated one or more reminder task items belong to the same pre-defined mood category.

18. The method of claim 17, comprising modifying incoming communications when the genre of music being played and the associated one or more reminder task items belong to the same pre-defined mood category.

\* \* \* \* \*